(12) United States Patent
Chiang

(10) Patent No.: US 6,986,610 B2
(45) Date of Patent: Jan. 17, 2006

(54) CONNECTION MODULE FOR OPTICAL TRANSCEIVERS

(75) Inventor: Tu Kuo Chiang, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 262 days.

(21) Appl. No.: 10/353,966

(22) Filed: Jan. 30, 2003

(65) Prior Publication Data

US 2004/0105632 A1    Jun. 3, 2004

(30) Foreign Application Priority Data

Nov. 29, 2002    (TW) .............................. 91219276 U

(51) Int. Cl.
*G02B 6/36*    (2006.01)

(52) U.S. Cl. .............................. 385/92; 385/83; 385/88

(58) Field of Classification Search .................. 385/92, 385/53, 55, 56, 75, 76, 83, 88
See application file for complete search history.

(56) References Cited

U.S. PATENT DOCUMENTS

| | | | | |
|---|---|---|---|---|
| 5,203,021 A | * | 4/1993 | Repplinger et al. | 455/575.9 |
| 5,546,273 A | * | 8/1996 | Harris | 361/697 |
| 5,875,047 A | * | 2/1999 | Abe et al. | 398/135 |
| 5,884,197 A | * | 3/1999 | Ricardo et al. | 455/575.7 |
| 6,175,108 B1 | * | 1/2001 | Jones et al. | 250/227.14 |
| 6,420,963 B1 | * | 7/2002 | Rossetti et al. | 340/310.01 |
| 6,585,540 B2 | * | 7/2003 | Gutierrez et al. | 439/620 |
| 6,786,653 B1 | * | 9/2004 | Hwang et al. | 385/92 |
| 2003/0236019 A1 | * | 12/2003 | Hanley et al. | 439/372 |
| 2004/0013369 A1 | * | 1/2004 | Coffey et al. | 385/53 |

* cited by examiner

*Primary Examiner*—Kaveh Kianni
(74) *Attorney, Agent, or Firm*—Birch, Stewart, Kolasch & Birch, LLP

(57) ABSTRACT

A connection module of optical transceiver is provided for interconnection between an optical transceiver and different types of fiber optic connectors. It consists of a housing and various types of receptacles. A first cover and a second cover are combined to form the housing. Each receptacle has a connector port for a specific type connector to plug in. All of the receptacles have a common connection structure to attach onto the housing.

16 Claims, 5 Drawing Sheets

US 6,986,610 B2

CONNECTION MODULE FOR OPTICAL TRANSCEIVERS

BACKGROUND OF THE INVENTION

1. Field of Invention

The invention relates to a fiber optic connection module and, in particular, to a connection structure between an optical transceiver and different types of fiber connectors.

2. Related Art

Currently, the standards of optical transceivers and fiber connectors on the market are established by each manufacturer. Therefore, they are often incompatible with one another. In other words, the optical transceivers and fiber connectors made by each manufacturer have one-to-one correspondence. Such examples include the Lucent connect (LC) developed by Bell Laboratory, the former Lucent Tech., Inc, the miniature unit (MU) of NTT, Inc., and the SC commonly used in North America. Any of the above-mentioned fiber connector cannot be connected with other types of optical transceiver. This problem results from market competition. In order to increase their market occupancy, the manufacturers are forced to design the connection ports of their optical transceivers in such a way to comply with the connector standards of their own. However, this results in great troubles for manufacturers that make optical communication devices and optic fiber networks.

Therefore, there are adapters for connecting different types of optical devices. For example, the MU/SC adapter made by Bullwill, Inc. is designed for connecting MU and SC connectors. However, it is still inconvenient to use the adapters. For instance, one has to purchase optical cables with MU connectors on both ends and an adapter in order to connect an SC connector and an MU optical transceiver. Even a professional optic fiber network engineer can only remove the SC connectors and put in an MU connector at each optic cable terminal. This requires one to have all the elements and installation tools for the MU connector. Therefore, adaptors are obviously ineffective for the installation of a local optic fiber network or even achieving the goal of fiber to the desk (FTTD). Moreover, they often increase the cost.

SUMMARY OF THE INVENTION

The invention solves the problem that the optical transceiver and different types of optic fiber connectors are incompatible.

In view of the foregoing, the connection module for optical transceivers provided by the invention includes a receptacle and a housing. The receptacle has an input terminal and an output terminal. The input terminal is connected with an optic cable connector, and the output terminal has two parallel connection parts. The housing encloses an optical transceiver. It is consisted of a first cover and a second cover. Two connection parts are provided on the same side of the first cover and the second cover for them to be embedded into the corresponding connection parts on the output terminal of the receptacle. Therefore, the optical transceiver can be connected with different types of connectors.

The invention can achieve the goal of connecting an optical transceiver with different types of connectors through the disclosed connection module.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

Figure 1:
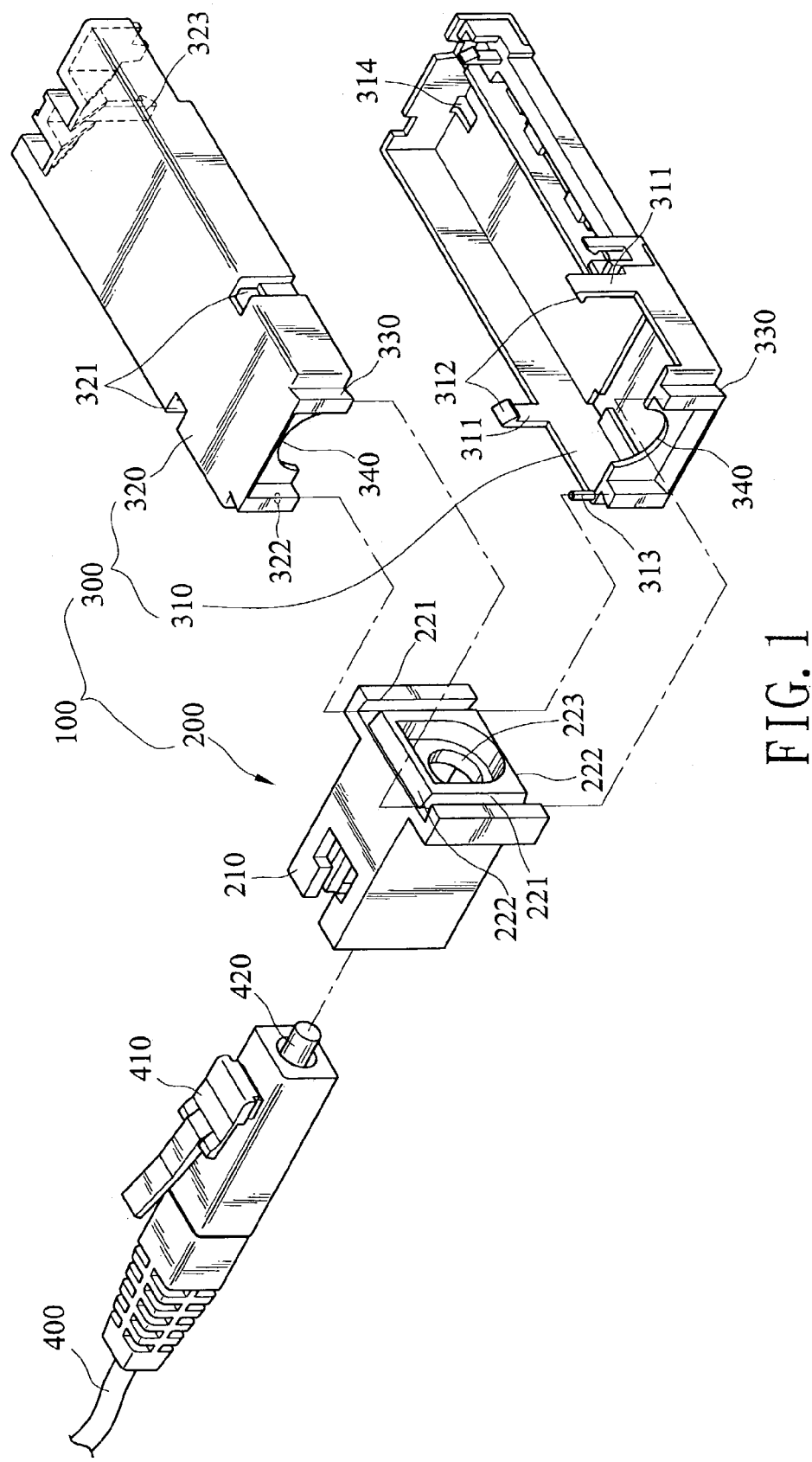
FIG. 1 is a three-dimensional view of the first embodiment of the disclosed connection module for optical transceivers with LC receptacles.
Figure 2:
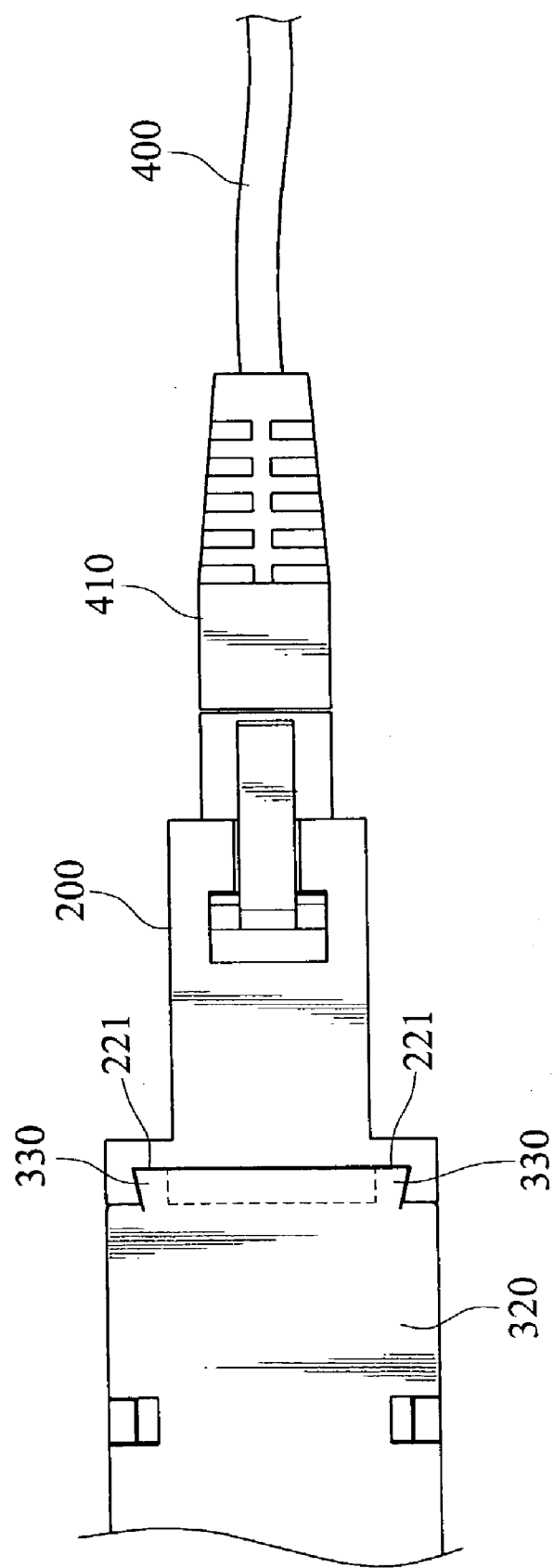
FIG. 2 is a cross-sectional view of connection parts of the LC receptacle and the housing depicted in FIG. 1.

With reference to FIGS. 1 and 2, the optical transceiver connection module 100 in the first embodiment has a receptacle 200 and a housing 300 for accommodating an optical transceiver (now shown).

The receptacle 200 is of the LC type. Its input terminal 210 is for the connection of the connector 410 of an optic cable 400. The connector 410 is also an LC-type fiber connector compatible with the receptacle. The output terminal 220 has two parallel trapezoid grooves 221, two stop parts 222, and a through hole 223. The two grooves 221 and the two stop parts 222 roughly form a rectangle. The through hole 223 allows multiple optic fibers 420 wrapped inside the optic cable 400 to pass through. It is connected to the photo sensor on the circuit board in the optical transceiver.

The housing 300 consists of a first cover 310 and a second cover 320 to accommodate all elements (not shown) of the above-mentioned optical transceiver. The corresponding sides of the first cover 310 and the second cover 320 have a U-shape protruding tracks 330, which also have trapezoid cross sections to match with the grooves 221 on the receptacle 220. The two covers 310, 320 have an opening 340 on the inner side for the optic fibers 420 to go through. The first cover 310 has two hook arms 311 on opposite sides and extending toward the second cover 320. The end of each of the hook arms 311 has a hook 312. The second cover 320 is formed with hook holes 321 corresponding to the hooks 312. The first cover 320 is further formed with pins 313 extending toward the second cover 320. Correspondingly, the second cover 320 has a pinhole 322. The back end of the second cover 320 also has a hook arm 323 extending toward the first cover 310. The end of the hook arm 323 is also a hook. A hook hole 314 corresponding to the hook arm 323 is formed on the first cover 310.

The elements described in the above paragraph are combined in the following manner. The first cover 310 and the second cover 320 are combined with the receptacle 200 by aligning the U-shape protruding tracks 330 with the grooves 221 on the output terminal 220. Finally, the inner sides of the closing ends of the two U-shape protruding tracks 330 touch the stop parts 222 of the receptacle 200. Since the grooves 221 and the protruding tracks 330 have matching trapezoid cross sections, the first and second covers 310, 320 and the receptacle 200 can be tightly combined and will not depart along the axial direction of the optic fibers 420. At the same time, the pin 313 on the first cover 310, the hooks 312 of the hook arms 311, and the hook holes 314 combine with the hook holes 321, the pinhole 322, and the hook arm 323 on the second cover 320. In practice, one needs to finish the connection between the optic fibers 420 and the photo sensor on the circuit board of the optical transceiver inside the housing 300 before assembly. Moreover, there are many other choices for combining the first and second covers 310, 320 in the prior art.

Figure 3:
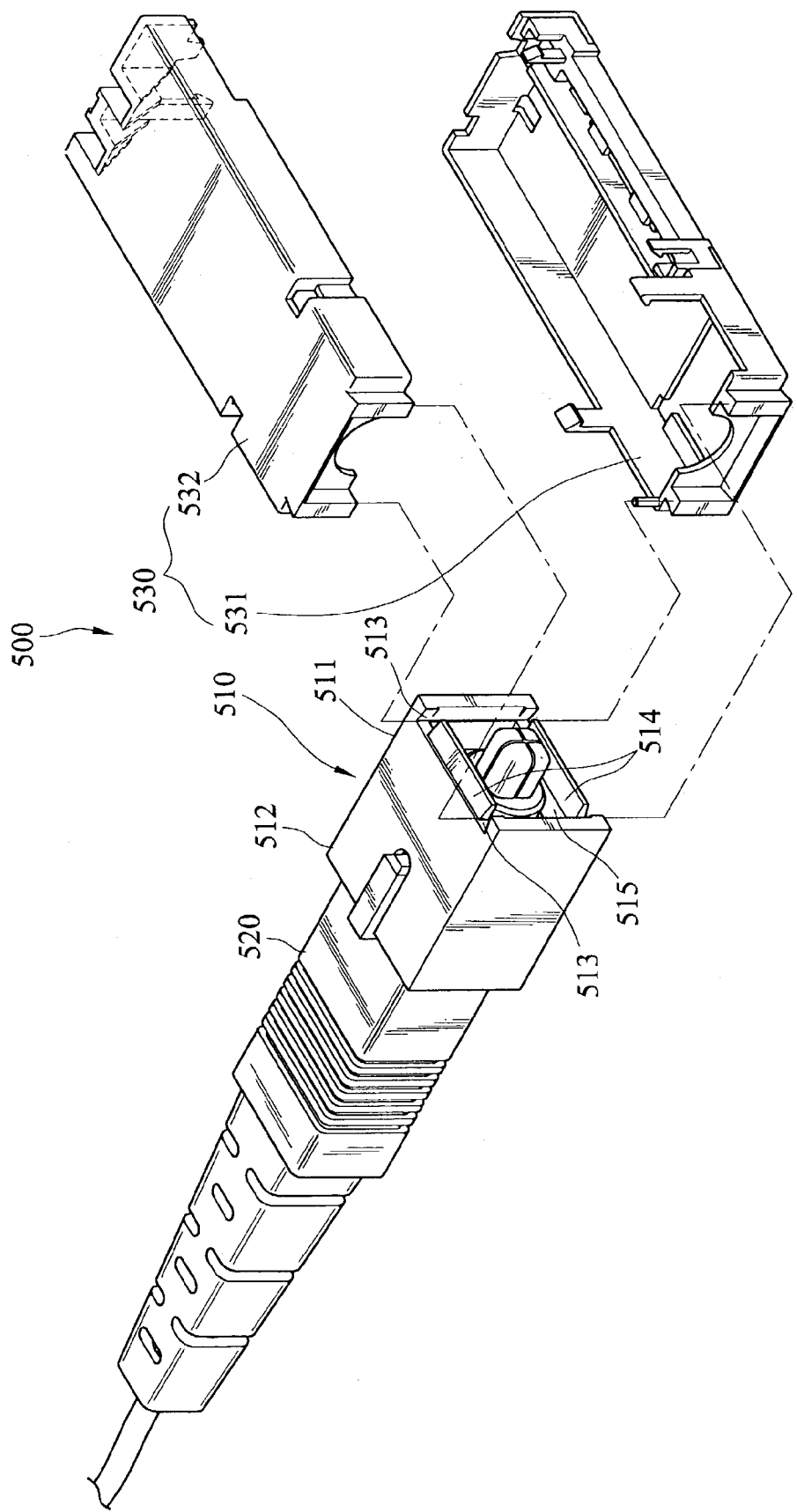
FIG. 3 is a three-dimensional view of the second embodiment of the disclosed connection module for optical transceivers with SC receptacles.
Figure 4:
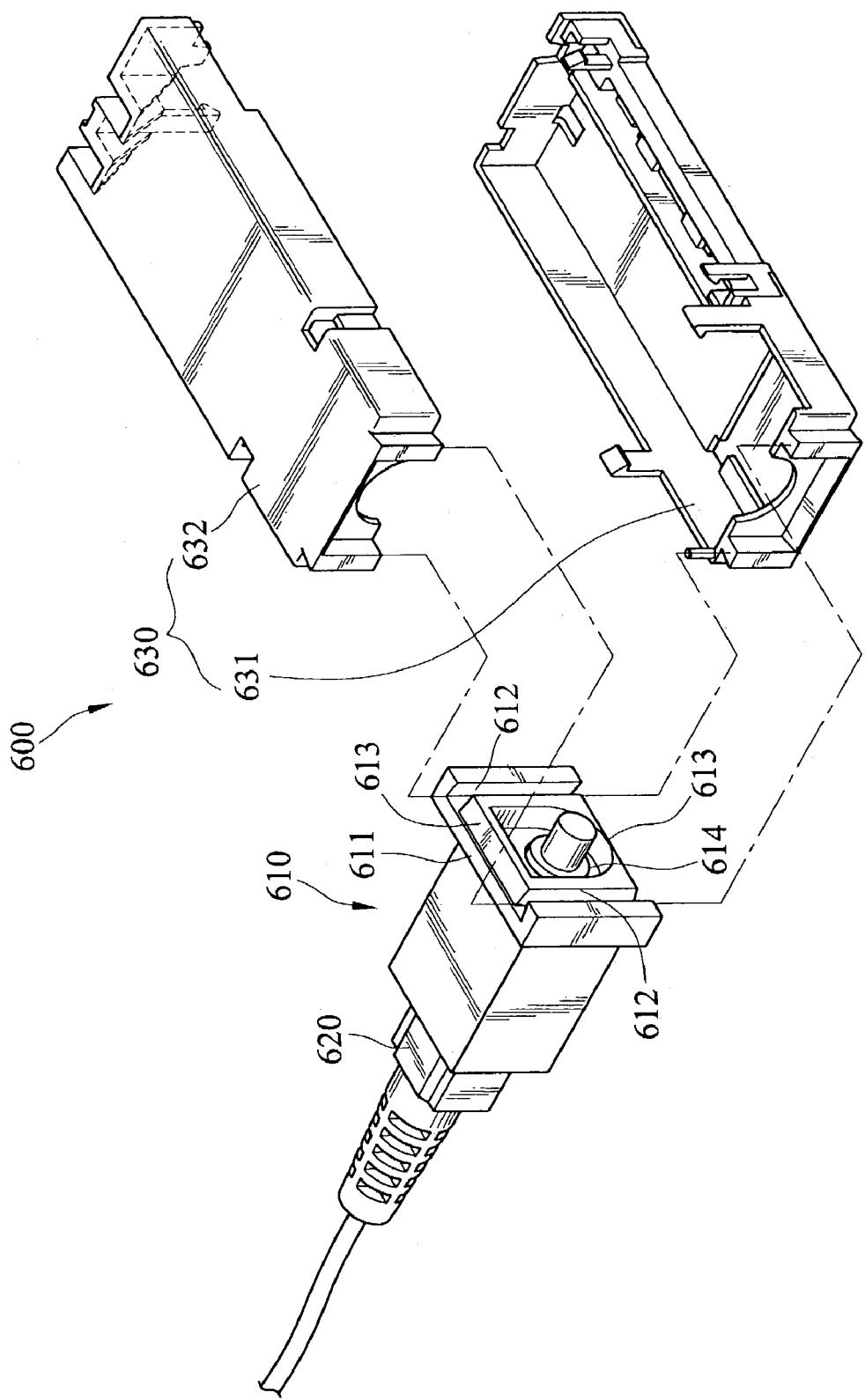
FIG. 4 is a three-dimensional view of the third embodiment of the disclosed connection module for optical transceivers with MU receptacles.

A connection module 500 for optical transceivers provided in the second embodiment of the invention is shown in FIG. 3. The housing 530 is exactly the same as in the previous embodiment. The only difference is that the receptacle 510 is the SC type (the connector 520 connected with the input terminal is the same). The output terminal 511 of the receptacle 510 also has two parallel grooves 513 with trapezoid cross sections, two parallel stop parts 514, and a through hole 515. The two grooves 513 and the two stop parts 514 also roughly form a rectangle. Therefore, it is assembled in exactly the same way as the first embodiment. Likewise, the third embodiment of a connection module 600 for optical receptacles shown in FIG. 4 is only different from the above-mentioned ones in that the receptacle 610 (including the connector 620) is replaced with a MU type one. The output terminal 611 of the receptacle 610 also has two parallel grooves 612 with trapezoid cross sections, tow parallel stop parts 613, and a through hole 614. The two grooves 612 and the two stop parts 613 also roughly form a rectangle. Therefore, the first cover 631 and the second cover 632 can be combined into the housing 630 in the same way as the first embodiment.

As disclosed in the above three embodiments, the invention utilizes the design of two separate covers and a U-shape protruding tracks to make an optical transceiver compatible with the LC, SC, and MU connectors or other small-form-factor (SFF) standards, such as MT-RJ (AMP, Inc.) and VF-45 (3M, Inc.). Moreover, both single-mode and multiple-mode optic fibers can be used with the invention.

Figure 5:
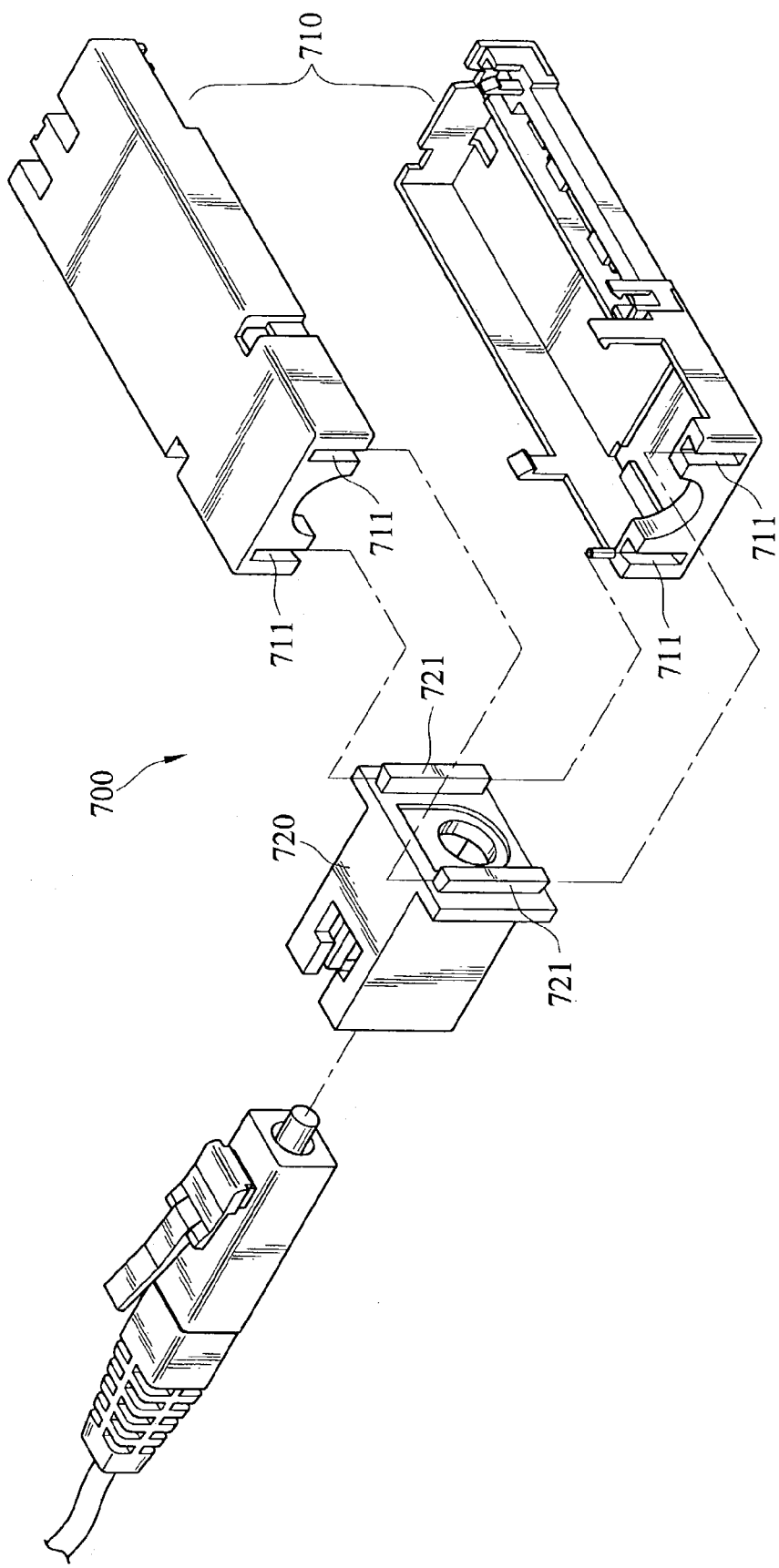
FIG. 5 is a three-dimensional view of the fourth embodiment of the disclosed connection module for optical transceivers.

Furthermore, the positions of the protruding tracks and the grooves can be mutually interchanged. For example, the connection module 700 of the fourth embodiment shown in FIG. 5 has the two parallel grooves on the housing 710, while the parallel protruding tracks 721 are designed on the receptacle 720. The cross sections of the grooves 711 and the protruding tracks 721 are matching trapezoids.

Based upon the techniques of the invention, the connection port of a normal optical transceiver housing is singled out as a receptacle. The housing is separated into independent first cover and second cover, which have matching connection parts. The connection port of the receptacle can be of any standard, and the receptacle of any standard has the same matching part so as to combine with the first and second covers.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A connection module used in an optical transceiver for connecting the optical transceiver with a plurality of connectors of different specifications, the connection module comprising:
   a housing, which covers the optical transceiver and has a first cover and a second cover, the first cover having a first connection part on one exterior side of the first cover, the second cover having a second connection part on one exterior side of the second cover, the first connection part being aligned with the second connection part; and
   a receptacle, which has an input terminal and an output terminal, the input terminal being connected with one connector of at least one optic cable and the output terminal having a third connection part for connecting with the first connection part and the second connection part.

2. The connection module used in an optical transceiver of claim 1, wherein the third connection part includes two parallel grooves, and the first and second connection parts on the housing are two U-shape protruding tracks.

3. The connection module used in an optical transceiver of claim 2, wherein two parallel stop parts restricted by the protruding tracks are formed near the third connection part.

4. The connection module used in an optical transceiver of claim 2, wherein the grooves of the receptacle and the protruding tracks of the housing have matching trapezoid shapes.

5. The connection module used in an optical transceiver of claim 1, wherein the third connection part of the output terminal of the receptacle are two parallel protruding tracks and the first and second connection parts on the housing are two U-shape grooves.

6. The connection module used in an optical transceiver of claim 5, wherein the grooves of the receptacle and the protruding tracks of the housing have matching trapezoid shapes.

7. The connection module used in an optical transceiver of claim 1, wherein the first cover has at least one hook arm with a hook at the end extending toward the second cover and the second cover has one hook hole corresponding to each of the hooks.

8. The connection module used in an optical transceiver of claim 1, wherein the first cover has at least one pin extending toward the second cover and the second cover has at least one pinhole corresponding to the pin.

9. The connection module used in an optical transceiver of claim 1, wherein the receptacle and the connectors are of the standard selected from LC, MU, SC, ST, MTP, FJ, MT-RJ, and VF-45.

10. The connection module used in an optical transceiver of claim 1, wherein the optic cable includes a plurality of optic fibers selected from single-mode and multi-mode optic fibers.

11. A connection module used in an optical transceiver for connecting the optical transceiver with a plurality of connectors of different specifications, the connection module comprising:
    a receptacle, which has an input terminal and an output terminal, the input terminal being connected with one connector of an optic cable and the output terminal having two parallel grooves and two stop parts, roughly forming a rectangle; and
    a housing, which covers the optical transceiver and consists of a first cover and a second cover, one same side of the first cover and the second cover having two matching U-shape protruding tracks for connection with the grooves on the output terminal of the receptacle and touching the stop parts.

12. The connection module used in an optical transceiver of claim 11, wherein the grooves of the receptacle and the protruding tracks of the housing have matching trapezoid shapes.

13. The connection module used in an optical transceiver of claim 11, wherein the first cover has at least one hook arm with a hook at the end extending toward the second cover and the second cover has one hook hole corresponding to each of the hooks.

14. The connection module used in an optical transceiver of claim 11, wherein the first cover has at least one pin extending toward the second cover and the second cover has at least one pinhole corresponding to the pin.

15. The connection module used in an optical transceiver of claim 11, wherein the optic cable includes a plurality of optic fibers selected from single-mode and multi-mode optic fibers.

16. The connection module used in an optical transceiver of claim 11, wherein the receptacle and the connectors are of the standard selected from LC, MU, SC, ST, MTP, FJ, MT-RJ, and VF-45.

* * * * *